United States Patent [19]

Mischke et al.

[11] Patent Number: 5,366,512
[45] Date of Patent: Nov. 22, 1994

[54] LOW-DUST OR DUST-FREE DYE PREPARATIONS

[75] Inventors: Peter Mischke, Bad Soden am Taunus; Konrad Opitz, Liederbach; Karl Rebsamen, Hofheim am Taunus, all of Germany

[73] Assignee: Hoechst Aktiengesellschaft, Frankfurt am Main, Germany

[21] Appl. No.: 949,557

[22] PCT Filed: May 8, 1991

[86] PCT No.: PCT/EP91/00868
§ 371 Date: Nov. 10, 1992
§ 102(e) Date: Nov. 10, 1992

[87] PCT Pub. No.: WO91/18059
PCT Pub. Date: Nov. 28, 1991

[30] Foreign Application Priority Data

May 11, 1990 [DE] Germany ............... 4015183
Nov. 3, 1990 [DE] Germany ............... 4035029

[51] Int. Cl.$^5$ ............................................. C09B 67/42
[52] U.S. Cl. ........................................... 8/524; 8/526; 8/611
[58] Field of Search ..................... 8/524, 526, 611

[56] References Cited

U.S. PATENT DOCUMENTS

| | | | |
|---|---|---|---|
| 2,604,469 | 7/1952 | Herrmann | 8/524 |
| 3,560,134 | 2/1971 | Streck | 8/580 |
| 3,583,877 | 6/1971 | Rosenblum et al. | 8/580 |
| 4,069,013 | 1/1978 | Hett et al. | 8/524 |
| 4,295,851 | 10/1981 | Neumann et al. | 8/524 |
| 4,397,652 | 8/1983 | Neumann | 8/524 |

FOREIGN PATENT DOCUMENTS

| | | |
|---|---|---|
| 0661016 | 9/1965 | Belgium . |
| 23638 | 2/1981 | European Pat. Off. . |
| 2507188 | 9/1976 | Germany . |
| 258022 | 7/1988 | Germany . |
| 0652338 | 8/1950 | United Kingdom . |
| 0842791 | 7/1960 | United Kingdom . |

*Primary Examiner*—Paul Lieberman
*Assistant Examiner*—Margaret Einsmann

[57] ABSTRACT

The invention provides for the use of alkanediols of from 4 to 8 carbon atoms as dustproofing agents in solid dye preparations. Dye preparations (powders) which contain such alkanediols are extremely low-dusting.

12 Claims, No Drawings

LOW-DUST OR DUST-FREE DYE PREPARATIONS

The invention relates to the field of dye preparations.

Pulverulent dye preparations are widely produced and used in industry, for example for preparing padding and dyeing liquors for dyeing textile materials and for preparing print pastes for printing paper and textiles. Pulverulent dye preparations are prone to dusting not only in the course of being produced but also in use. This can lead to dye losses, the contamination of places of work and materials being worked, and health hazards for the people concerned with handling such dusting preparations.

There have been various suggestions for solving this problem.

For instance, liquid preparations and granules have been developed. Liquid preparations are naturally free of dusting, but they have other disadvantages, such as limited shelf lives and low dye contents, which necessitates increased packaging, storage and transportation costs. In addition, liquid preparations can be prepared only from sufficiently soluble dyes. Granules require special production technologies and can be produced only with additional and costly apparatus. Moreover, most granular products are likewise not dust-free from the start or form dust in the course of being packaged or transferred or during transportation. Like powders they must therefore be treated with dustproofing agents, albeit with smaller amounts thereof.

On the other hand, there have been many attempts to convert pulverulent dyes into a low-dust or dust-free form with dustproofing agents. Examples of substances used for this purpose include phthalic esters, silicones, dodecylbenzene, surfactants and mineral oil alone or combined with nonionic, anionic or cationic surfactants (see for example U.S. Pat. Nos. 2,604,469 and 3,560,134, German Patent 834,237, German Offenlegungsschrift 2,523,096, German Auslegeschrift 1,117,582 and European Patent Application Publication 0 023 638A).

However, the use of any of these dustproofing agents or dust removal methods is associated with considerable risks and disadvantages. Mineral oils and other water-insoluble dustproofing agents generally have an adverse effect on the cold water solubility important for energy-saving low-temperature dyeing methods. They are also responsible for the formation of oily deposits in the dyeing liquors, which may cause spotty, unlevel dyeings. This is one of the reasons for adding surfactants, another reason being that they are intended to ensure the uniform dispersion of the water-insoluble dustproofing agents if the latter are added to the dye solutions, dispersions or suspensions even before drying, for example spray drying. Apart from the fact that surfactants give rise to unwanted foam—unwanted because it disrupts the smooth running of the dyeing process—nonionic surfactants alone or combined with a mineral oil may likewise give rise to oily deposits in the dyeing liquors in particular under the conditions customary when dyeing with reactive dyes, namely the presence of electrolytes (such as sodium chloride or sodium sulfate) and alkali (such as sodium carbonate or sodium hydroxide), either because under these dyeing conditions the mineral oil-surfactant emulsions break or the cloud point of the nonionic surfactants is lowered to the dyeing temperature or below.

Ever since it was realized that dusting dyes can also represent a health hazard to the people handling them, significantly higher standards are expected of the dustproofness of a dye. For instance, the dust values whereby "dust-free" and "low-dust" dye preparations are delimited from dusting dye preparations in the above-mentioned German Auslegeschrift and European patent application publication fall a long way short of present-day expectations. Moreover, a dye powder having a dust value of below 10 cannot in general be considered dust-free. For instance, a dye powder having a dust number of less than 5 is entirely capable of evolving sufficient fine dust as to make it impossible to rule out a possible health hazard to the people who come into contact therewith. For this reason a method was developed (see Melliand Textilberichte 1989, pages 690–692) whereby the dust which arises is filtered off and the quantity of the filter residue (hereinafter referred to as "filter value") is determined. More specifically, a filter value of 1 denotes high dust development, while a filter value of 5 indicates that there was no visible dust residue on the filter. To be considered sufficiently dustproofed for present-day expectations in the field, a dye preparation must have a filter value of above 3.

Although the dustproofing agents used in prior art dye preparations which are more or less low in dust can be used in many cases to obtain filter values of greater than 3, by increasing the proportion of the dustproofing agent, the disadvantages of such dye preparations, such as foaming, oily deposits or worse solubility, become even more pronounced.

It has now been found that if alkanediols of from 4 to 8 carbon atoms are used as dustproofing agents it is possible to obtain excellent dye preparations of excellent cold water solubility which are free of the disadvantages of the prior art, more or less effectively dustproofed dye preparations and show only an extremely low dusting tendency, if any.

The present invention accordingly provides for the use of an alkanediol of from 4 to 8 carbon atoms or of a mixture of such alkanediols as dustproofing agent in solid, pulverulent dye preparations and also solid, pulverulent dye preparations which contain an alkanediol of from 4 to 8 carbon atoms.

The dye preparations of the present invention can be solid preparations of readily water-soluble, sparingly water-soluble or water-insoluble dyes, such as of anionic, cationic or nonionic dyes, for example of direct dyes, acid dyes, vat dyes, disperse dyes or reactive dyes, which belong to the various chemical classes, such as the monoazo, disazo, polyazo, stilbene, coumarin, triphenylmethane, oxazine, triphendioxazine, formazan or phthalocyanine dyes and metal complex dyes thereof, such as copper, nickel, chromium or cobalt complex azo dyes, copper and nickel phthalocyanine dyes and copper formazan dyes. Since the abovementioned disadvantages of the prior art dye preparations are particularly evident with the reactive dyes, the present invention is chiefly directed to this class of dyes, in particular to those which have a fiber-reactive grouping of the vinyl sulfone series.

Alkanediols which are usable according to the present invention are for example n-butane-1,3-diol, n-pentane-1,5-diol, n-pentane-2,5-diol, n-pentane-2,3-diol, neopentylglycol, n-hexane-2,5-diol and 2-methylpentane-2,4-diol. Of these, in particular 2-methylpentane- 2,4-diol, neopentylglycol and mixtures of these two compounds are preferred.

The low-dust dye preparations of the present invention can be prepared according to the present invention by adding all or preferably only some of the alkanediol component to the dye solution, dispersion or suspension before the drying, for example spray drying, step; this measure brings about not only the desired better handling of the dry material but also a longer service life and easier cleaning of the exit air filters of the drying apparatus. Furthermore, the low-dust dye preparations of the present invention can be prepared by mixing the alkanediols with the alkanediol-free or already alkanediol-containing dry dye powder. Diluents and/or other auxiliaries may likewise be added before or after the drying step. The alkanediols can be used alone or mixed with one another. A mixture of two or more of the alkanediols is used in particular when a diol is not liquid at room temperature (as for example in the case of neopentylglycol) and it is to be added after the drying step. The liquefaction of a solid diol for the purpose of adding it after the drying step can also be effected by mixing it with a little water or by heating it slightly.

The dye preparations of the present invention may additionally contain customary amounts of the diluents and auxiliaries customary and necessary for each dye class, such as inorganic salts (for example sodium chloride or sulfate), anionic, cationic or nonionic surfactants, for example the ligninsulfonates, naphthalenesulfonic acid-formaldehyde condensation products (in which the naphthalenesulfonic acid component may be alkyl-substituted), alkoxylated aliphatic or aromatic hydroxy compounds and quaternized nitrogen compounds which are known from the literature for use as dispersants, buffer substances, for example the alkali metal salts of phosphoric acid, of acetic acid, of boric acid or of citric acid, sequesterants, such as polyphosphates and polymeric aliphatic carboxylic acids, for example polyacrylic acids and copolymers of acrylic acid with maleic acid, wetting agents, stabilizers, such as reducing agents and reduction inhibitors, and also hydrotropic substances.

The dye preparations of the present invention may contain the dyes within wide limits, for example in amounts of from 20 to 80% by weight, based on the total amount of the preparation. Preference is given to dye preparations having a dye content of from 30 to 70% by weight. In general, the preparations, in particular those of water-soluble dyes, will contain customary diluents (for example electrolytes, such as sodium sulfate, sodium chloride or potassium chloride) in an amount of from 10 to 60% by weight. The alkanediols which are to be used according to the present invention are present in the preparations in an amount of from 0.5 to 20% by weight, preferably between 1 and 10% by weight. Others of the abovementioned auxiliaries, such as buffer substances, dispersants, etc, can be present in the preparations in a total amount of up to 40% by weight. The proportions of the components in the preparations naturally add up to 100% by weight.

The present invention further provides for the use of the solid dye preparations of the present invention for dyeing materials which are customary for the particular type of dye by dyeing methods which are customary for the type of dye and the type of material. The materials which can be dyed/colored with the preparations of the present invention can for example be present in the form of unextruded compositions, films or fiber materials. Such materials are for example carboxamido- and/or hydroxyl-containing materials of synthetic or natural origin, such as synthetic polyamides, wool and hairs, polyvinyl alcohols and regenerated natural cellulose fiber materials, such as filament viscose rayon and cotton. Preparations of fiber-reactive dyes or acid dyes according to the present invention are preferably useful, as would be expected of these types of dye, for dyeing synthetic and natural polyamides and natural cellulose fiber materials. Further materials which can be advantageously dyed or colored with preparations of the present invention which contain for example disperse dyes are, for example polyurethane, polyacrylonitrile and polyester materials or cellulose acetates in unextruded form or as fiber materials. Preparations of cationic (basic) dyes according to the present invention are suitable for example for dyeing acid-modified polyacrylonitrile materials, in particular in the form of fibers. Furthermore, preparations of the present invention which contain not only anionic or cationic but also water-insoluble or sparingly water-soluble dyes can also be used for coloring cellulose fiber derivatives, such as paper, for example by printing.

The examples which follow serve to illustrate the invention. Parts are by weight, unless otherwise stated. Parts by weight bear the same relation to parts by volume as the kilogram to the liter.

EXAMPLE 1

308 parts of an electrolyte(predominantly sodium chloride)-containing powder of the known dye of the formula

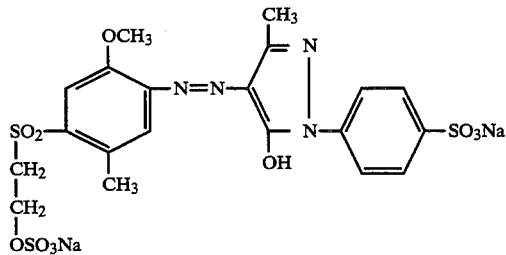

having a dye content of 81% by weight were homogenized in a mixer with 167 parts of the sodium salt of a naphthalenesulfonic acid-formaldehyde condensation product having a degree of sulfonation of from 80 to 120% and an average molecular weight of about 6500, and also with 25 parts of 2-methylpentane-2,4-diol. The dye preparation obtained is readily water-soluble and has a filter value of 4. This degree of dustproofness was maintained even after 4 months' storage at room temperature or after 4 weeks' storage at 40° C.

The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 2

A dye preparation of the present invention was produced as described in Example 1, except that the naphthalenesulfonic acid-formaldehyde condensation product was replaced by 83.5 parts of sodium sulfate and 83.5 parts of a commercial sodium ligninsulfonate. The dye preparation has similar properties to that of Example 1.

EXAMPLE 3

A mixer is used to prepare a homogeneous mixture of 254 parts of an electrolyte(predominantly sodium sulfate)-containing powder of the dye of the formula

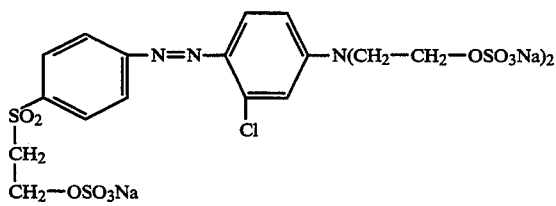

(known from Example 3 of U.S. Pat. No. 4,271,072) having a dye content of 81% by weight with initially 15.5 parts of sodium sulfate and 15.5 parts of the sodium salt of a commercial naphthalenesulfonic acid-formaldehyde condensation product having a degree of sulfonation of from 80 to 120% and a molecular weight of about 6500 and then with 15 parts of 2-methylpentane-2,4-diol. The novel dye preparation obtained is readily water-soluble. It was found to have a filter value of 5. This excellent degree of dustproofing does not even change in the course of 6 weeks' storage at 40° C.

The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 4

In a mixing apparatus 78 parts of an electrolyte (predominantly sodium chloride)-containing powder of the dye of the formula

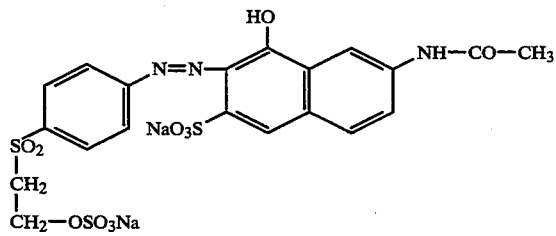

(known from column 8 lines 24 to 26 or Example 2 of U.S. Pat. No. 4,707,545) having a dye content of 75.5% by weight were mixed with 16 parts of sodium sulfate and 6 parts of 2-methylpentane-2,4-diol to form a homogeneous mixture. The dye preparation obtained is readily soluble not only in warm water but also in cold water, and has a filter value of 3–4. This advantageous property of very low dusting is shown by the dye preparation of the present invention even after 6 months' storage at room temperature or after 4 weeks' storage at 40°C.

The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 5

388 parts of an electrolyte-containing powder of the dye of the formula

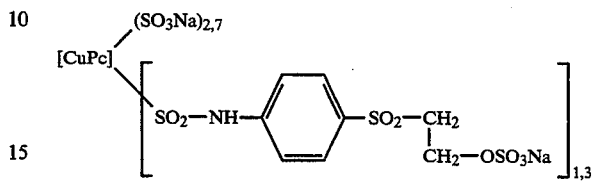

(known from German Offenlegungsschrift 1,179,317) having a dye content of 79.3% by weight were homogeneously mixed with 182 parts of a commercial naphthalenesulfonic acid-formaldehyde condensation product (as sodium salt) having a degree of sulfonation of from 80 to 120% and a molecular weight of about 6500 and 30 parts of 2-methylpentane-2,4-diol. The resulting dye preparation of the present invention is readily soluble not only in warm but also in cold water. It is nondusting and has a filter value of 5, which was also found following 6 months' storage at room temperature or 6 weeks' storage at 40° C.

EXAMPLE 6

64.7 parts of the starting dye powder used in Example 5 were homogeneously mixed with 30.3 parts of the sodium salt of a naphthalenesulfonic acid-formaldehyde condensation product having a degree of sulfonation of from 80 to 120% and a molecular weight of about 6500 and 5 parts of n-butane-1,3-diol. The resulting dye preparation of the present invention, which was very readily soluble even in cold water, had a filter value of 4, which remained unchanged even following 6 months' storage at room temperature or 6 weeks' storage at 40° C. The dye preparation of the present invention can be used in the usual manner employed for fiber-reactive dyes for dyeing for example cellulose fiber materials, such as cotton, in strong, fast dyeings; the alkanediol used according to the present invention does not affect the dyeing process and high quality of the dyeings in any way.

EXAMPLE 7

A dye preparation of the present invention was produced as described in Example 5, except that the 2-methylpentane-2,4-diol was replaced by the same amount of n-pentane-1,5-diol. The resulting dye preparation of the present invention is very readily soluble even in cold water, has a filter value of 4, which remains unchanged even over long storage periods, and produces dyeings of similar quality to those of the dye preparation of Example 5.

EXAMPLE 8

62 parts of an electrolyte(predominantly sodium chloride)-containing powder of the known dye of the formula

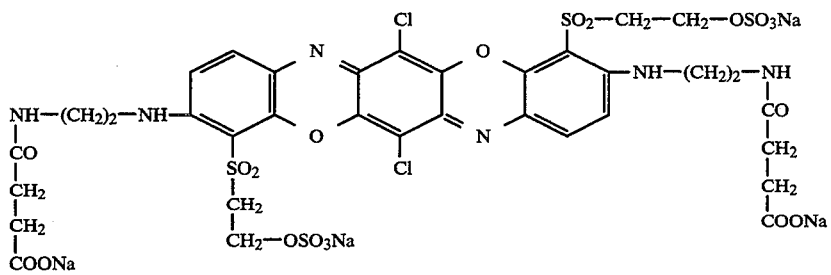

(known from Example 3 of the European patent application of Publication No. 0 258 493 A1) having a dye content of 56.5% by weight were homogeneously mixed with 33 parts of the sodium salt of a naphthalenesulfonic acid-formaldehyde condensation product having a degree of sulfonation of from 80 to 120% and a molecular weight of about 6500, and 5 parts of 2-methylpentane-2,4-diol. The resulting dye preparation of the present invention is very readily soluble in cold water and exhibits excellent dustproofing with a filter value of 5, which remains unchanged even over a period of 6 months at room temperature or 6 weeks at 40° C. This preparation can be used by conventional dyeing methods to obtain strong, clean dyeings of excellent quality.

EXAMPLE 9

68 parts of an electrolyte-containing powder of the dye of the formula

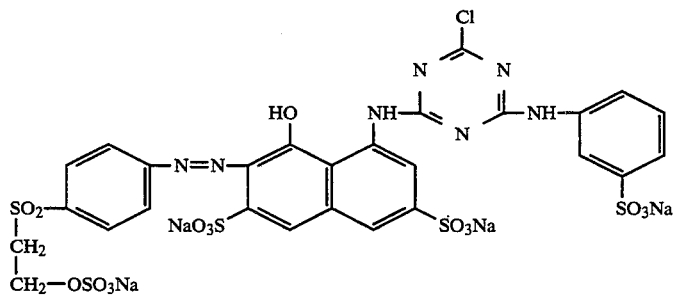

(known from Example 1 of U.S. Pat. No. 4,703,112) having a dye content of 60.3% by weight were homogeneously mixed with 27 parts of sodium sulfate and 5 parts of 2-methylpentane-2,4-diol to give a fine dye powder. The dye preparation of the present invention possesses very good cold water solubility; its filter value is found to be 4–5.These excellent properties of the preparation survive even long storage periods unchanged. The dyeings obtainable therewith are of high quality; the dustproofing agent it contains does not affect the dyeing properties or the quality of the dyeings in any way.

EXAMPLE 10

A dye preparation of the present invention was prepared by homogeneous mixing of 770 parts of an electrolyte (predominantly sodium chloride)-containing powder of the dye of the formula (known from Example 1 of U.S. Pat No. 4,725,675) having a dye content of 53.3% by weight, 180 parts of sodium sulfate and 50 parts of 2-methylpentane-2,4-diol. This preparation too is very readily soluble in cold water and has a filter value of 4–5. These advantageous properties survive even long storage periods intact, and the obtainable dyeings have similar qualities as are obtainable with the dye if it does not contain the dustproofing agent used according to the present invention.

EXAMPLE 11

A dye preparation of the present invention is produced as described in Example 1, except that 25 parts of n-butane-1,3-diol are used as dustproofing agent. The preparation has similar application properties to that of Example 1. The filter value of 4 remains unchanged even on prolonged storage at elevated temperature.

EXAMPLE 12

181 parts of the electrolyte-containing powder of the azo dye used in the preceding Example 1, having a dye content of 82.9% by weight, were mixed with 52 parts of sodium sulfate, 52 parts of the sodium salt of a naphthalenesulfonic acid-formaldehyde condensation product having a degree of sulfonation of from 80 to 120% and an average molecular weight of about 6500, and 15 parts of n-hexane-2,5-diol to give a homogeneous dye powder. The dye preparation of the present invention possesses an excellent degree of dustproofing with a filter value of 5. It is very readily soluble even in cold water and produces clean, high-quality dyeings and prints, for example on cotton, if applied by the application and fixing methods customary for fiber-reactive dyes. The high-quality properties of the dye preparation of the present invention survive even long storage periods, such as 4 weeks at 40° C., or 4 months at 20° C., unchanged.

EXAMPLE 13

A dye preparation of the present invention was produced as described in Example 12, except that the dustproofing agent used was the same amount of n-pentane-1,5-diol. The dye preparation of the present invention has similar application and dyeing properties with an excellent degree of dustproofing (filter value 5) to the preparation of Example 12.

EXAMPLE 14

15 parts of neopentylglycol were dissolved in 15 parts of 2-methylpentane-2,4-diol at 40° C. The liquid mixture of two dustproofing agents according to the present invention is added in a mixing apparatus to a mixture of 104 parts of the sodium salt of a naphthalenesulfonic acid-formaldehyde condensation product having a degree of sulfonation of from 80 to 120% and a molecular weight of about 6500 and 362 parts of an electrolyte (predominantly sodium chloride)-containing powder of the known monoazo dye used in the preceding Example 1, having a dye content of 82.9% by weight, to produce a homogeneous mixture. The resulting finely pulverulent dye preparation of the present invention has a high degree of dustproofing with a filter value of 4, is very readily soluble in cold water and dyes for example cotton in high quality in a conventional manner. The presence of the dustproofing agent used according to the present invention does not impede the dyeing process or impair the quality of the obtainable dyeings in any way. The good properties of the dye preparations survive even long storage unchanged.

EXAMPLE 15

388 parts of an electrolyte-containing powder which contains 79.3% by weight of the dye used in the preceding Example 5 were homogeneously mixed with 182 parts of a commercial sodium salt of a naphthalenesulfonic acid-formaldehyde condensation product having a degree of sulfonation of from 80° to 120° C. and a molecular weight of about 6500 and a liquid mixture of 15 parts of neopentylglycol and 15 parts of 2-methylpentane-2,4-diol to give a solid, finely pulverulent dye preparation. The preparation of the present invention has a filter value of 4 and is readily soluble even in cold water. Applied in a conventional manner, for example to cotton, similar strong, clean dyeings are obtained as are obtained with the dye in the absence of the dustproofing agent of the present invention. The very high quality of the dye preparation of the present invention remains virtually unchanged even after a storage time of 6 months at 20° C. or of more than 6 weeks at 40° C.

EXAMPLE 16

177.6 parts of an electrolyte-containing powder of the dye of the formula

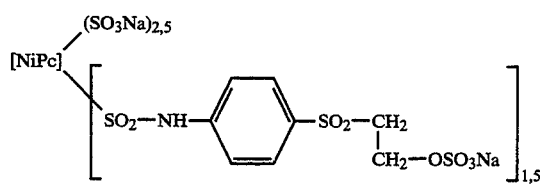

(known from German Offenlegungsschrift 1,179,317) having a dye content of 59.2% by weight were mixed with 107.5 parts of the sodium salt of a naphthalenesulfonic acid-formaldehyde condensation product having a degree of sulfonation of from 80 to 120% and a molecular weight of about 6500, and 15 parts of 2-methylpentane-2,4-diol to give a homogeneous, finely pulverulent dye powder. The preparation of the present invention has a filter value of 4–5, is readily soluble even in cold water, retains these good properties even on prolonged storage, and produces for example on cotton in a conventional manner level, clean dyeings in the same way as are obtained with the dye in the absence of the dustproofing agent of the present invention.

EXAMPLE 17

A dye preparation of the present invention is produced as described in Example 16, except that the dustproofing agent used is 15 parts of n-hexane-2,5-diol. The resulting dye preparation of the present invention has similar properties to that of Example 16.

EXAMPLE 18

70 parts of an electrolyte(predominantly sodium chloride and potassium chloride)-containing powder of the known dye of the formula

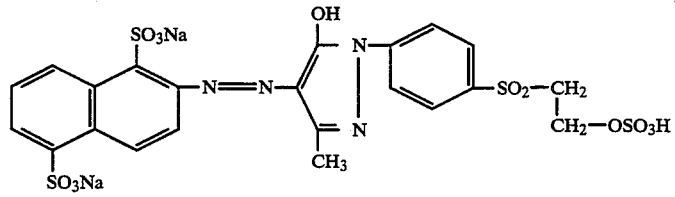

having a dye content of 58.8% by weight were homogenized in a mixer with 27 parts of sodium sulfate and 3 parts of 2-methylpentane-2,4-diol. The dye preparation obtained is readily soluble even in cold water and has a filter value of 5. This degree of dustproofing does not change even in the course of 4 months' storage at room temperature or in the course of 4 weeks' storage at 40° C. The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 19

96 parts of a spray-dried pulverulent mixture of 65 parts of the known dye of the formula

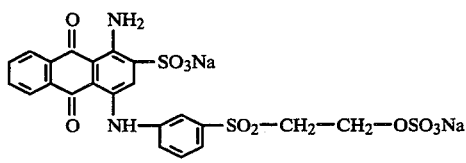

21 parts of the sodium salt of a naphthalenesulfonic acid-formaldehyde condensation product having a degree of sulfonation of from 80 to 120% and an average molecular weight of about 6500, and 10 parts of sodium anthraquinone-2-sulfonate were homogenized with 4 parts of 2-methylpentane-2,4-diol in a mixer. The dye preparation obtained is readily water-soluble and has a filter value of 4–5. This degree of dustproofing remained unchanged even after 4 months' storage at room temperature or after 4 weeks' storage at 40° C. The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 20

54 parts of an electrolyte(predominantly sodium chloride)-containing powder of the dye of the formula

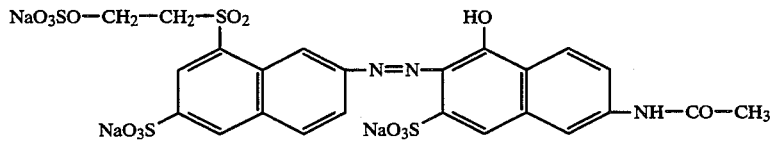

(Known from German Offenlegungsschrift 1,943,904) having a dye content of 94.4% by weight were homogenized with 36 parts of sodium sulfate and 10 parts of 2-methylpentane-2,4-diol in a mixer. The dye preparation obtained is readily water-soluble and has a filter value of 4. This degree of dustproofing does not change even in the course of 4 months' storage at room temperature or 4 weeks' storage at 40° C. The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 21

308 parts of an electrolyte(predominantly sodium chloride)-containing powder containing 81% by weight of the monoazo dye used in the preceding Example 1 were homogenized in a mixer with 68 parts of sodium sulfate and 24 parts of 2-methylpentane-2,4-diol. The dye preparation obtained is readily water-soluble and has a filter value of 4. This degree of dustproofing remained unchanged even in the course of 4 months' storage at room temperature or 4 weeks' storage at 40° C. The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 22

80 parts of an electrolyte(predominantly sodium chloride)-containing powder of the known dye of the formula

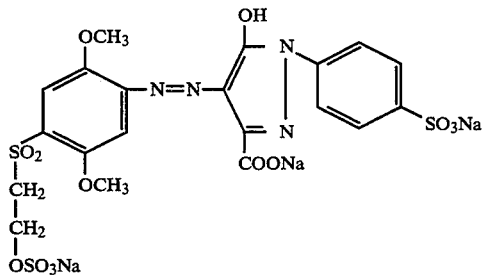

having a dye content of 62.5% by weight were homogenized in a mixer with 18 parts of sodium sulfate and 2 parts of 2-methylpentane-2,4-diol. The dye preparation obtained is readily water-soluble and has a filter value of 5.This degree of dustproofing remained unchanged even in the course of 4 months' storage at room temperature or 4 weeks' storage at 40° C.

The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 23

In a mixing apparatus 77 parts of an electrolyte (predominantly sodium chloride)-containing powder of the dye of the formula

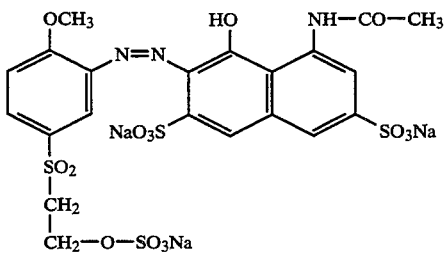

(known from German Patent No. 965,902) having a dye content of 64.6% by weight were mixed with 20 parts of sodium sulfate and 3 parts of 2-methylpentane-2,4-diol to give a homogeneous mixture. The dye preparation obtained is readily soluble not only in warm water but also in cold water and has a filter value of 5. This advantageous property of very low dusting is shown by the dye preparation of the present invention even after 6 months' storage at room temperature or after 4 weeks' storage at 40° C.

The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 24

87 parts of an electrolyte(predominantly sodium chloride)-containing powder of the dye of the formula

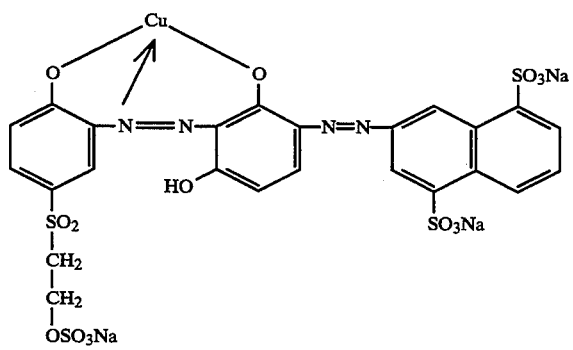

(known from German Auslegeschrift No. 1,233,963) having a dye content of 63.3% by weight were homogenized in a mixer with 11 parts of sodium sulfate and 2 parts of 2-methylpentane-2,4-diol. The dye preparation obtained is readily water-soluble and has a filter value of 5. This degree of dustproofing remains unchanged even after four months' storage at room temperature or four weeks' storage at 40° C.

The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 25

In a mixing apparatus 88.5 parts of an electrolyte (predominantly sodium chloride)-containing powder of the dye of the formula

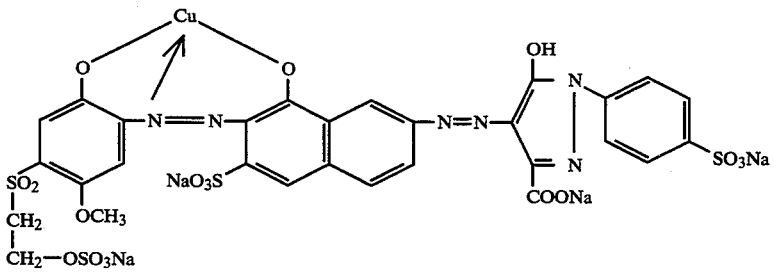

(known from German Auslegeschriften Nos. 1,126,542 and 1,544,538) having a dye content of 44.4% by weight were mixed with 6.5 parts of sodium sulfate and 5 parts of 2-methylpentane-2,4-diol to give a homogeneous mixture. The dye preparation obtained is readily soluble not only in warm water but also in cold water, and has a filter value of 5.This advantageous property of very low dusting is shown by the dye preparation of the present invention even after 6 months' storage at room temperature or after 4 weeks' storage at 40° C.

The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 26

In a mixing apparatus, 78 parts of an electrolyte (predominantly sodium chloride)-containing powder of the dye of the formula

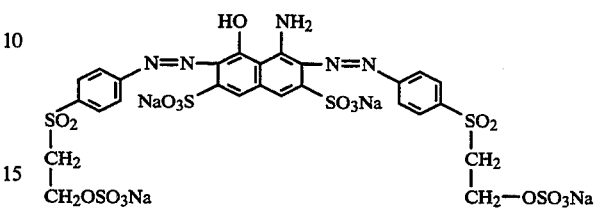

(known from German Patent No. 965,902) having a dye content of 64% by weight were mixed with 21 parts of sodium sulfate and 1 part of 2-methylpentane-2,4-diol to a homogeneous mixture. The dye preparation obtained is readily soluble not only in warm water but also in cold water, and has a filter value of 5. This advantageous property of very low dusting is shown by the dye preparation of the present invention even after 6 months' storage at room temperature or after 4 weeks' storage at 40° C. The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 27

In a mixing apparatus, 85 parts of an electrolyte (predominantly sodium chloride)-containing dye mixture containing 55.6% by weight of the dye of the formula shown in Example 26 and 13.5% by weight of the dye of the formula

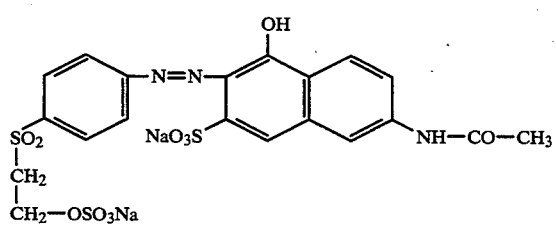

(known as constituent of this mixture from Japanese Patent Application Publication Sho-58-160362) were mixed with 12 parts of sodium sulfate and 3 parts of 2-methylpentane-2,4-diol to give a homogeneous mixture. The dye preparation obtained is readily soluble not only in warm water but also in cold water, and has a filter value of 5. This advantageous property of very low dusting is shown by the dye preparation of the present invention even after 6 weeks' storage. The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 28

80 parts of an electrolyte(predominantly sodium chloride)-containing powder of the dye of the formula

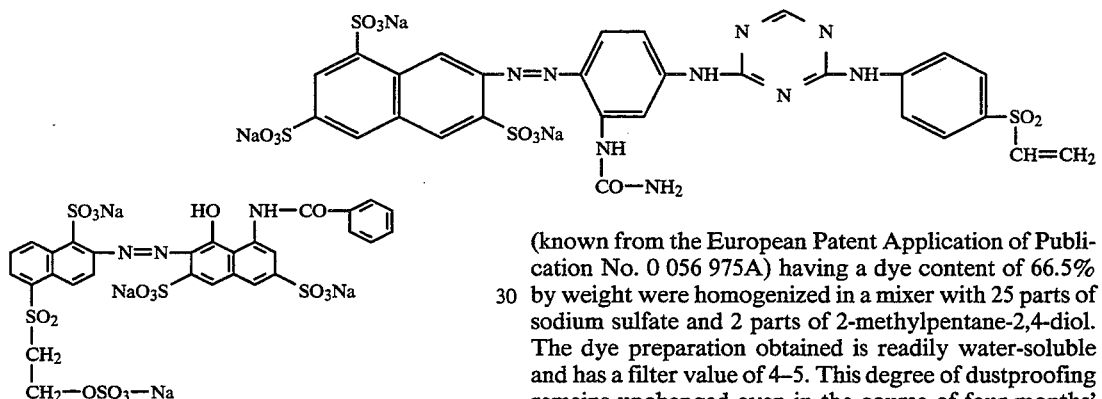

(known from German Offenlegungsschrift 1,943,904) having a dye content of 67.1% by weight were homogenized in a mixer with 18 parts of sodium sulfate and 2 parts of 2-methylpentane-2,4-diol. The dye preparation obtained is readily water-soluble and has a filter value of 5. This degree of dustproofing remains unchanged even in the course of four months' storage at room temperature or four weeks' storage at 40° C.

The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 29

91 parts of an electrolyte (predominantly sodium chloride)-containing powder of the dye of the formula

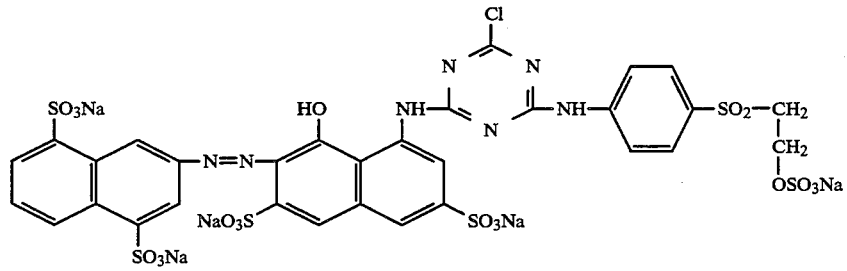

(known from Japanese Patent Application Publications Sho-48-52258 and Sho-58-55189) having a dye content of 56.6% by weight were homogeneously mixed with 7 parts of sodium sulfate and 2 parts of 2-methylpentane-2,4-diol.

The dye preparation obtained is readily water-soluble and has a filter value of 5. This degree of dustproofing remains unchanged even in the course of four months' storage at room temperature or four weeks' storage at 40° C.

The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 30

73 parts of an electrolyte (predominantly sodium chloride)-containing powder of the dye of the formula

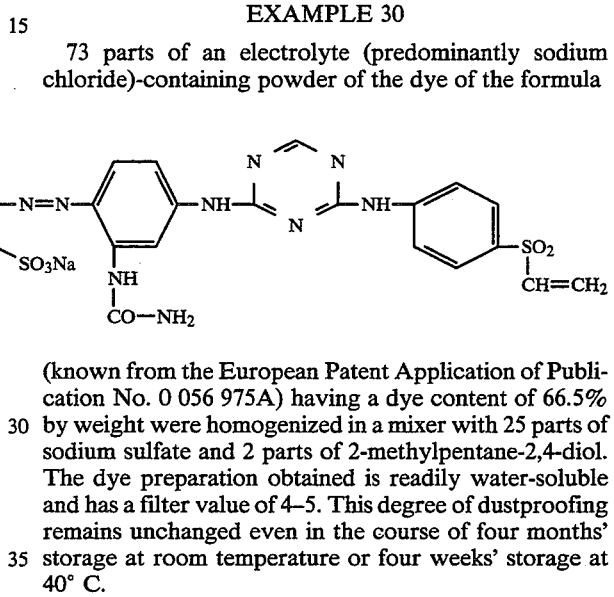

(known from the European Patent Application of Publication No. 0 056 975A) having a dye content of 66.5% by weight were homogenized in a mixer with 25 parts of sodium sulfate and 2 parts of 2-methylpentane-2,4-diol. The dye preparation obtained is readily water-soluble and has a filter value of 4–5. This degree of dustproofing remains unchanged even in the course of four months' storage at room temperature or four weeks' storage at 40° C.

The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 31

In a mixing apparatus, 83.3 parts of an electrolyte (predominantly sodium chloride)-containing powder of the dye of the formula

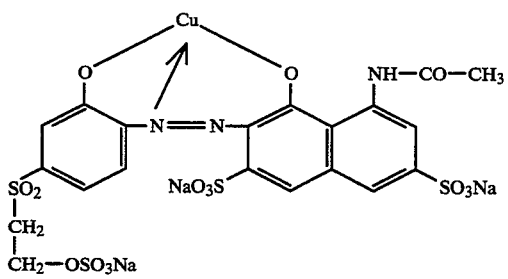

(known from German Auslegeschrift No. 1,126,542) having a dye content of 54% by weight were mixed with 11.7 parts of sodium sulfate and 5 parts of 2-methylpentane-2,4-diol to give a homogeneous mixture. The dye preparation obtained is readily soluble not only in warm water but also in cold water, and has a filter value of 5. This advantageous property of very low dusting is shown by the dye preparation of the present invention even after 4 weeks' storage at 40° C. The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 32

77 parts of an electrolyte(predominantly sodium sulfate)-containing powder of the dye of the formula

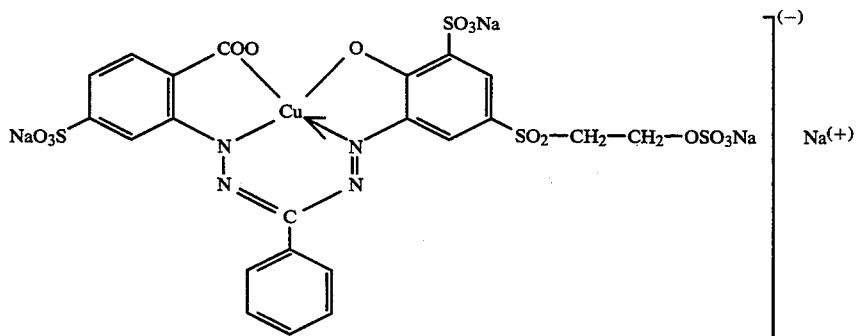

(known from German Offenlegungsschrift No. 2,945,532) having a dye content of 46.8% by weight were homogenized in a mixer with 19 parts of sodium sulfate and 4 parts of 2-methylpentane-2,4-diol. The dye preparation obtained is readily water-soluble and has a filter value of 4. This degree of dustproofing remains unchanged even in the course of four months' storage at room temperature or four weeks' storage at 40° C.

The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 33

In a mixing apparatus, 67 parts of an electrolyte (predominantly sodium chloride)-containing powder of the dye of the formula

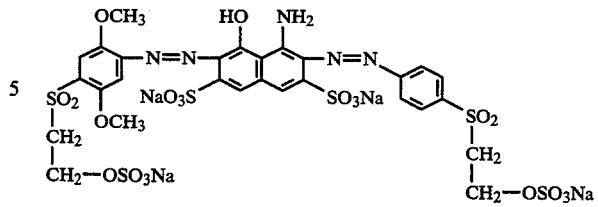

(known from German Offenlegungsschriften Nos. 3,113,885 and 3,113,989) having a dye content of 76.2% by weight were mixed with 31 parts of sodium sulfate and 2 parts of 2-methylpentane-2,4-diol to give a homogeneous mixture.

The dye preparation obtained is readily soluble not only in warm water but also in cold water, and has a filter value of 5. This advantageous property of very low dusting is shown by the dye preparation of the present invention even after 6 months' storage at room temperature or after 4 weeks' storage at 40° C. The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 34

76 parts of an electrolyte (predominantly sodium chloride)-containing powder mixture of the dyes of the formula

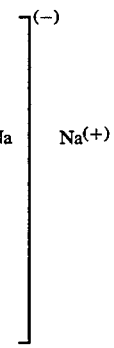

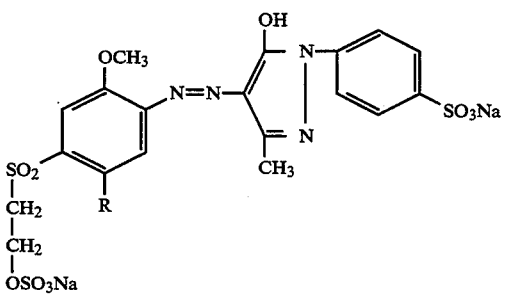

(known from German Offenlegungsschrift No. 2,442,553) containing 24.1% by weight of the dye where R=$CH_3$ and 48.5% by weight of the dye where R=$OCH_3$ were homogenized in a mixer with 21 parts of sodium sulfate and 3 parts of 2-methylpentane-2,4-diol. The dye preparation obtained is readily water-soluble and has a filter value of 5. This degree of dustproofing remains unchanged even in the course of four months' storage at room temperature or four weeks' storage at 40° C.

The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 35

81 parts of an electrolyte (predominantly sodium chloride)-containing powder of the dye of the formula

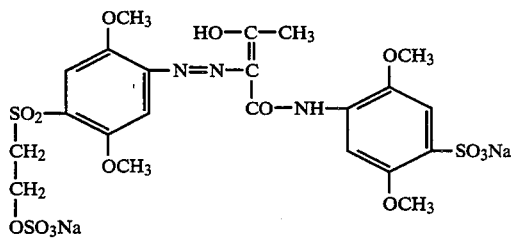

(known from German Auslegeschrift No. 1,664,157) having a dye content of 74.5% by weight were homogenized in a mixer with 11 parts of sodium sulfate and 8 parts of 2-methylpentane-2,4-diol. The dye preparation obtained is readily water-soluble and has a filter value of 4–5. This degree of dustproofing remains unchanged even in the course of four months' storage at room temperature or four weeks' storage at 40° C.

The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 36

In a mixing apparatus, 76.6 parts of an electrolyte (predominantly potassium chloride and sodium chloride)-containing powder of the dye of the formula

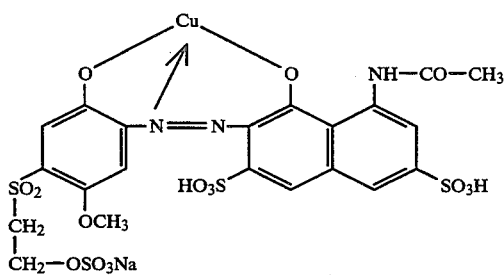

(known from German Auslegeschrift No. 1,126,542) having in the form of the sodium/potassium mixture a dye content of 43.1% by weight, 18.4 parts of sodium sulfate and 5 parts of 2-methylpentane-2,4-diol were mixed to form a homogeneous mixture. The dye preparation obtained is readily soluble not only in warm water but also in cold water, and has a filter value of 4. This advantageous property of very low dusting is shown by the dye preparation of the present invention even after 6 months' storage at room temperature or after 4 weeks' storage at 40° C.

The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 37

In a mixing apparatus, 84 parts of an electrolyte (predominantly sodium chloride)-containing powder of the dye of the formula

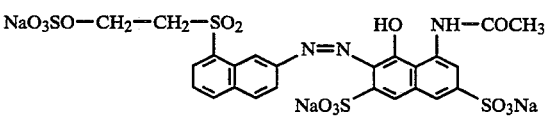

(known from German Offenlegungsschrift No. 2,142,728) having a dye content of 75.8% by weight were mixed with 14 parts of sodium sulfate and 2 parts of 2-methylpentane-2,4-diol to give a homogeneous mixture. The dye preparation obtained is readily soluble not only in warm water but also in cold water, and has a filter value of 5. This advantageous property of very low dusting is shown by the dye preparation of the present invention even after 6 months' storage at room temperature or after 4 weeks' storage at 40° C.

The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

EXAMPLE 38

A dye preparation of the present invention was produced as described in Example 5, except that the naphthalenesulfonic acid-formaldehyde condensation product was replaced by the same amount of sodium sulfate. The resulting dye preparation of the present invention is likewise readily soluble in cold water, has a filter value of 4–5, which remains unchanged even on prolonged storage, and produces dyeings of similar quality to the dye preparation of Example 5.

Example 39

3200 parts of an as-synthesized aqueous, electrolyte-containing solution of 404 parts of the dye of the formula

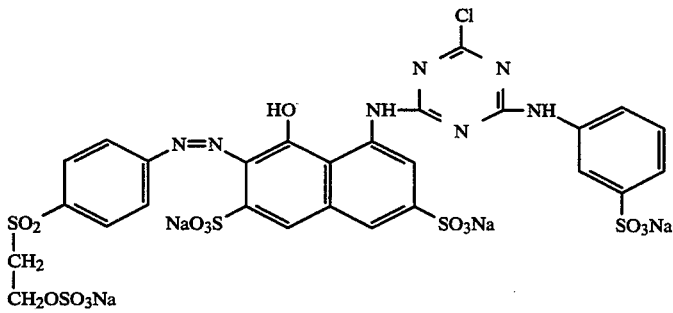

(known from Example 1 of U.S. Pat. No. 4,725,675) were mixed with 10 parts of 2-methylpentane-2,4-diol and spray-dried. This produced about 780 parts of a dye powder having a dye content of 52.5% by weight, which were mixed with a further 40 parts of 2-methylpentane-2,4-diol and 180 parts of sodium sulfate to give a homogeneous preparation of the present invention which was very readily soluble in cold water and had a filter value of 4–5. These advantageous properties remained unchanged even on prolonged storage, and the obtainable dyeings have similar qualities to those obtainable using the dye in the absence of the dustproofing agent used according to the present invention.

EXAMPLE 40

About 370 parts of an as-synthesized electrolyte-containing aqueous solution of 40 parts of the dye of the formula

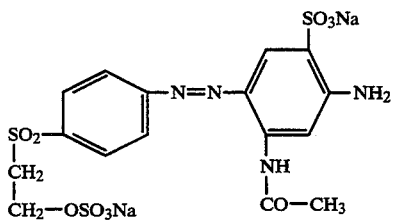

(known from Example 1 of U.S. Pat. No. 4,703,112) were admixed with 2 parts of neopentylglycol and spray-dried. This produced 70 parts of a dye powder having a dye content of 58.8% by weight, which was homogeneously mixed with 27 parts of sodium sulfate and 3 parts of 2-methylpentane-2,4-diol. The dye preparation of the present invention has very good cold water solubility; its filter value was found to be 4–5. These high-grade properties of the preparation remained virtually unchanged even on prolonged storage periods. The dyeings obtainable therewith are of high quality; the dustproofing agent it contains does not affect the dyeing properties and the quality of the dyeings in any way.

EXAMPLE 41

About 480 parts of an as-synthesized electrolyte-containing solution containing 35 parts of the dye of the formula indicated in Example 32 were admixed with a liquid mixture, prepared at 40° C., of 1 part of neopentylglycol and 1 part of 2-methylpentane-2,4-diol and spray-dried. The resulting 79 parts of dye powder having a dye content of 45.6% by weight are homogenized in a mixer with 18 parts of sodium sulfate and a further 3 parts of 2-methylpentane-2,4-diol. The dye preparation obtained is readily water-soluble and has a filter value of 4–5. This degree of dustproofing remains unchanged even in the course of four months' storage at room temperature or four weeks' storage at 40° C.

The dye preparation can be used in the usual manner employed for fiber-reactive dyes for dyeing for example cellulose fiber materials, such as cotton, in strong, fast shades; the dustproofing agent used according to the present invention does not affect the high quality of the dyeings and prints in any way.

We claim:

1. A solid, pulverulent dye preparation, containing a direct dye, an acid dye, a vat dye, a disperse dye, or a fiber-reactive dye and, as a dusting inhibition agent for said solid, pulverulent dye preparation,1 to 10% by weight based on the total weight of the preparation of an alkanediol of from 4 to 8 carbon atoms which is liquid at room temperature, or mixture, which is liquid at room temperature, of alkane diols of 4 to 8 carbon atoms.

2. A preparation as claimed in claim 1, wherein the dye is a fiber-reactive dye.

3. A preparation as claimed in claim 1, having a dye content of from 20 to 80% by weight.

4. A preparation as claimed in claim 1, wherein the alkanediol is 2-methylpentane- 2,4-diol.

5. A preparation as claimed in claim 1, wherein the dusting inhibition agent comprised a mixture of 2-methylpentane- 2-4-diol and neopentylglycol.

6. A preparation as claimed in claim 1, wherein the alkanediol is n-butane-1,3-diol.

7. A preparation as claimed in claim 1, wherein the alkanediol is n-pentane-1,5-diol.

8. A preparation as claimed in claim 1, wherein the alkanediol is n-hexane- 2,5-diol.

9. A preparation as claimed in claim 1, wherein the dusting inhibition agent comprises 2-methylpentane-2,4-diol, n-butane-1,3-diol, pentane-1,5-diol or n-hexane-2,5-diol or a mixture of at least two such alkanediols with each other or with neopentylglycol.

10. A preparation as claimed in claim 1, wherein said solid, pulverulent dye preparation has a filter value greater than 3.

11. A process for reducing or inhibiting the dusting of solid dye preparations, which comprises combining a solution, dispersion or suspension of a dye or a solid dye preparation with an alkanediol of from 4 to 8 carbon atoms which is liquid at room temperature, or a mixture, which is liquid at room temperature, of alkanediols of 4 to 8 carbon atoms and converting the resulting combination, optionally after drying, into a solid, pulverulent preparation.

12. A process as claimed in claim 11, wherein said dye is a direct dye, an acid dye, a vat dye, a disperse dye, or fiber-reactive dye.

* * * * *